United States Patent
Darden et al.

Patent Number: 6,026,224
Date of Patent: Feb. 15, 2000

[54] REDUNDANT VIAS

[75] Inventors: Laura Rohwedder Darden, Essex Junction; William John Livingstone, Cambridge; Jeannie Harrigan Panner, Underhill; Patrick Edward Perry, Essex Junction; William Frank Pokorny, Jericho; Paul Steven Zuchowski, Fletcher, all of Vt.

[73] Assignee: International Business Machines Corporation, Armonk, N.Y.

[21] Appl. No.: 08/753,137

[22] Filed: Nov. 20, 1996

[51] Int. Cl.⁷ .................................................. G06F 17/50
[52] U.S. Cl. .................... 395/500.11; 395/500.09; 395/500.12
[58] Field of Search .................... 364/488, 489, 364/491, 490

[56] References Cited

U.S. PATENT DOCUMENTS

| | | | |
|---|---|---|---|
| 4,831,725 | 5/1989 | Dunham et al. | 29/847 |
| 5,124,273 | 6/1992 | Minami | 364/491 |
| 5,165,166 | 11/1992 | Carey | 29/847 |
| 5,448,496 | 9/1995 | Butts et al. | 364/489 |
| 5,798,937 | 8/1998 | Bracha | 364/490 |

OTHER PUBLICATIONS

IBM Invention Disclosure, Algorithms For Automatically Improving Yeild and Reliability in VLSI Designs Assembled By Programs, Dec. 1991.

*Primary Examiner*—Kevin J. Teska
*Assistant Examiner*—Thuan Do
*Attorney, Agent, or Firm*—Richard M. Kotulak

[57] ABSTRACT

A wiring design tool which detects minimum area vias and replaces them with redundant vias pairs. The invention uses the definitions for single vias and tracks in a grid coordinate system and a file describing the design wires and their interconnections to select the most favorable direction for the placement. The invention accomplishes this by examining the directions one track away from each single via at various levels and according to the methodology of this invention, detects a possible situs for a redundant via pair, preferably where a segment of wire on the same net already exists. If no design rule violation occurs the system replaces the single via with a redundant via pair.

16 Claims, 8 Drawing Sheets

Metal added on both M1 and M2.

REDUNDANT VIAS

BACKGROUND OF THE INVENTION

This invention relates to automatic place and route tools used to provide wiring patterns on semiconductor integrated circuits, and more particularly to a physical design tool that detects vias that may lead to yield and reliability problems and creates larger or redundant vias.

Quite often semiconductor manufacturers suffer lower yields and reliability problems due to via resistance introduced by vias of minimum area. In order to obtain dense designs, automatic place and route tools use minimum width and space wires. As such, vias created by these tools are of minimum area. These single minimum area vias can have increased resistance.

This results in yield problems for high performance circuits. This is especially true for Application Specific Integrated Circuits (ASIC) which have global wiring patterns that are needed to interconnect cells in the ASIC library and where a majority of the global chip wiring is accomplished by automatic wiring tools. Additionally, because testing, thermal cycling and burn-in do not accelerate detection of via resistance problems, minimum area vias often lead to more field returns. Finally, with the increasing performance and density of integrated circuits, the RC delay due to via resistance is becoming a larger factor in timing.

Of course, one solution to this problem is to simply have automatic wiring tools introduce redundant vias into the design. However, since many products like ASICs have complex wiring patterns, the automatic introduction would likely lead to larger die size and uncompetitive products. In other words, any yield and reliability benefit from universally using doubled or larger vias is offset by a larger, less productive chip die size.

A second solution, which is unfeasible for many modern designs, is the manual insertion of larger shapes after the wiring design is completed. Not only is this impracticable for complex designs, where the number of vias in a design are in the millions, but it also leads to inconsistent optimizations across a design.

A third solution, in use at International Business Machine Microelectronic's Division's circuit design centers, is to use shape processing-based tools to provide a post processing in program which adds vias and metal caps as flat shapes where feasible under the design rules for the process. There are problems with this approach, too. The processing time in using such an approach can be great. Secondly, the system algorithm must flatten any nested shapes which results in large data volumes. Thirdly, this approach does not provide the analysis capabilities you need in undertaking such tasks such as timing or electromigration analysis. Fourthly, the shapes based approach is more cumbersome to fit into the designer's methodology. As circuits increase in performance and complexity these factors become a much greater consideration.

Therefore, what is needed is a solution that minimizes additional critical metal, processes efficiently, works with design methodologies and tools, and allows for ease of engineering change.

SUMMARY OF INVENTION

It is therefore one object of this invention to allow for the design tool to be independent of the underlying design methodology.

It is another object of this invention to provide the benefits of extra vias while minimizing additional critical metal area.

It is another object of this invention to make the redundant vias visible in the design for use by other tools, (for example, timing and electromigration analysis tools) and for ease of engineering change over the life of the design.

It is yet another object of this invention to provide a design tool that leads to large runtime improvements over previous methods.

It is yet another object of this invention to support hierarchial designs and allow the tool to be executed for the parent level of the design or for other levels or objects of the design on a priority basis.

In accordance with these and other objectives the present invention is addressed to a wiring design tool and methodology which detects minimum area vias and replaces them with redundant vias pairs which minimize the amount of extra metal created. In one embodiment of the invention a three-dimensional grid-based model is used to represent the integrated circuit design. The input to the invention is a file describing the design wires and their interconnections on the chip. The invention then uses the definitions for single vias and tracks and grid coordinates to select the most favorable direction for the redundant via placement, preferably placing the via where a segment of wire on the same net already exists. The invention accomplishes this by examining the environment one track in the east, north, west and south directions at various levels and according to the methodology of this invention, detects a possible situs for the via based on a certain methodology in a favorable direction and, if no Design Rule Check (DRC) violations would be created, replaces the via with a redundant via pair in the most favorable direction.

A further variation of the invention allows you to prioritize the order in which vias are worked on, so the more important paths or nets are addressed first.

The invention also includes a feature to remove redundant via pairs. By having this information a designer facing an engineering change can return either a part of the area of the wiring design or all of the wiring to its original state prior to implementing a change inserting the redundant vias.

BRIEF DESCRIPTION OF THE DRAWINGS

The present invention is illustrated by way of example and not limitation in the figures of the accompanying drawings which like references indicate similar elements.

DETAILED DESCRIPTION OF THE INVENTION

Figure 1:
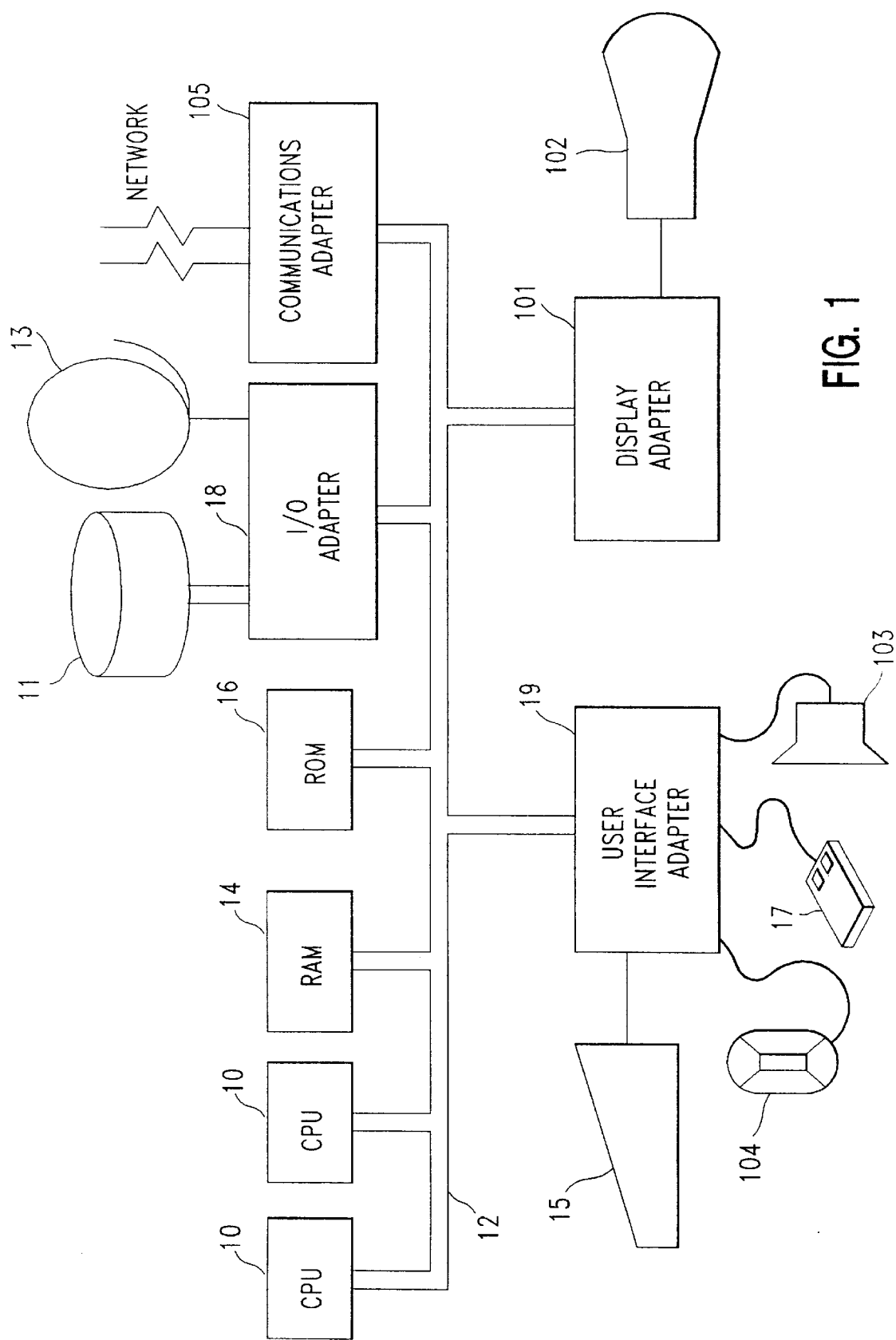
FIG. 1 is a block diagram of a representative computer/information handling system environment for practicing this invention.

A representative hardware environment for practicing the present invention is depicted in FIG. 1, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate on a wiring interconnect design which is loaded also loaded onto the computer system.

Today's design systems seek to make the wiring system as dense as possible, especially in integrated circuits like ASIC's where the wiring between library circuit models can result in large increases in chip sizes. So they do little to enhance the reliability of an automatically assembled layout. The vias of concern are the minimum area vias which are produced by these design systems. The system design tool of this invention creates redundant vias and creates them in such a way so as to maintain the chip size, maximize placement of redundant vias and minimize additional critical metal.

The system design tool is grid-based and uses the output of an automated wiring tool to create redundant vias for a design. Certain general definitions concerning the system help to provide an understanding of the tool. Typically, a three dimensional grid is defined by tracks in the x and y direction and by wiring layers in the z direction. A track is defined as the minimum periodicity for a minimum width wire and a minimum width space in a technology. A single via is defined as a minimum area via which can be used on a minimum width wire plus the metal caps above and below the via. A redundant via pair is defined as two adjacent single vias plus the metal caps above and below the via.

The software supporting the invention which is run on standard hardware design environments was developed as a function of IBM's graphical design editor, ChipEdit. However, other place and route grid-based wiring systems which are publicly available, such as CELL 3 from Cadence Design Systems, Inc., could be adapted to perform redundant via insertion as described by this invention.

For every wire single via, the invention examines the surrounding environment and, if no Design Rule Check (DRC) violations would be created, replaces the via with a redundant via pair in the most favorable direction.

The invention first examines the directions associated with any wire segments that interact with the via. Expansions in these directions are most favorable; minimizing the amount of extra metal created. If expansion in these directions would cause DRC violations, the invention examines the remaining directions for possible redundant via pair insertion.

Since adding redundant via pairs to a design may use additional wiring tracks, this invention would normally be used once the design wire placement and routing is complete.

The invention also includes a feature to remove redundant via pairs. Since redundant via pairs may occupy additional wiring tracks, they may need to be removed prior to any engineering change. For redundant via pair removal, the invention identifies every redundant via pair created by the insertion protocol and replaces the via pair with a single via. Redundant via pair removal preserves any redundant via pairs which may have been inserted by a different method such as another wiring tool or manual wiring within the design system.

The operational aspects of this invention can really be broken into three primary components and an component that includes operational steps for hierarchial designs.

Figure 7:
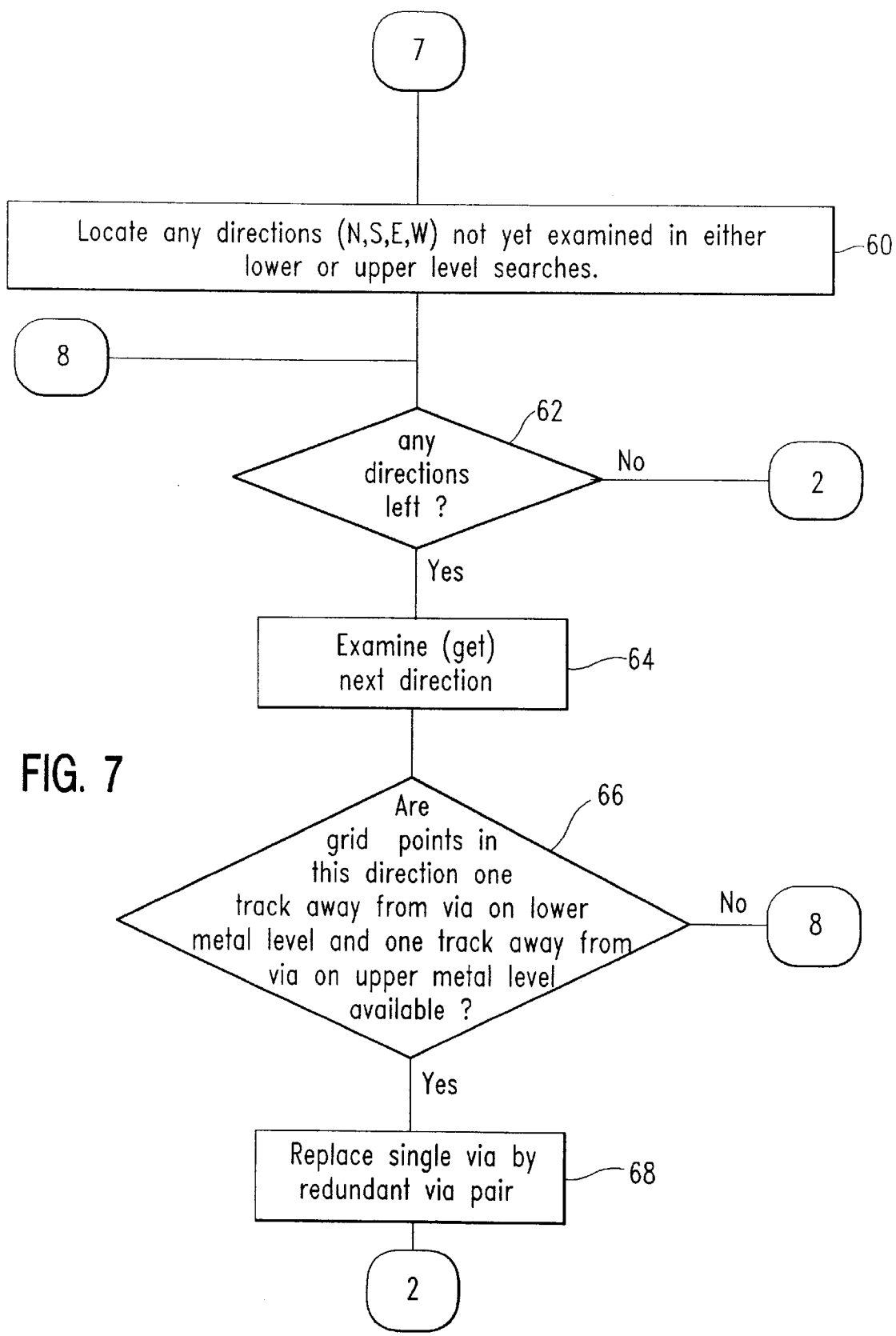
FIG. 7 is a block diagram of the No Metal Segment Intersection operation of this invention.

The four components are:
1. The Hierarchial Entity Loop (FIG. 2)
2. Lower Metal Segment Intersection (FIG. 3)
3. Upper Metal Segment Intersection (FIG. 5)
4. No Segment Intersection (FIG. 7)

Figure 2:
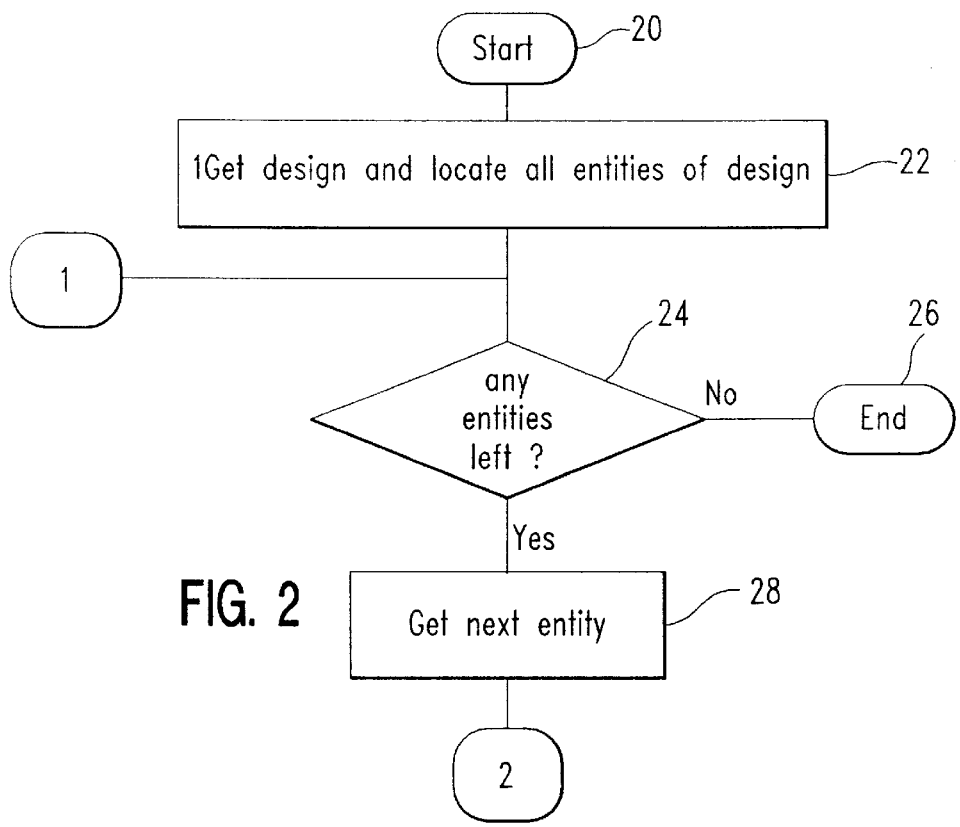
FIG. 2 is a block diagram of the Hierarchial Entity Loop of this invention.

Referring to FIG. 2, the Hierarchial Entity Loop is illustrated. The tool starts at 20 by accessing and loading at 22 into memory the wiring placement or routing as a result of using a place and routing tool such as CELL3 from Cadence Design Systems, Inc. or other place and route systems such as the IBM ChipBench system. This need not be an complete integrated circuit design, it could be only those designs or portions of a design under consideration. If the design is hierarchial, the tool will perform redundant via pair insertion entity by entity. So at decision step 24 it looks to see if there are any entities left to examine. If there are none, the job is complete, and it will end the run at 26. If there are any entities left it will at 28 access and examine the next entity. The entities could be ordered as a designer dictates and one level or area of the design could be given priority over another. For example, you may want to attempt to place redundant via pairs first in areas where placement is difficult, so that you are not later blocked from doing so by redundant via placement in adjacent levels or areas of a design. This would maximize the number of redundant via's being placed. After accessing the next entity we proceed to the next major operation, the Lower Segment Intersection of FIG. 3 (through 2).

Figure 3:
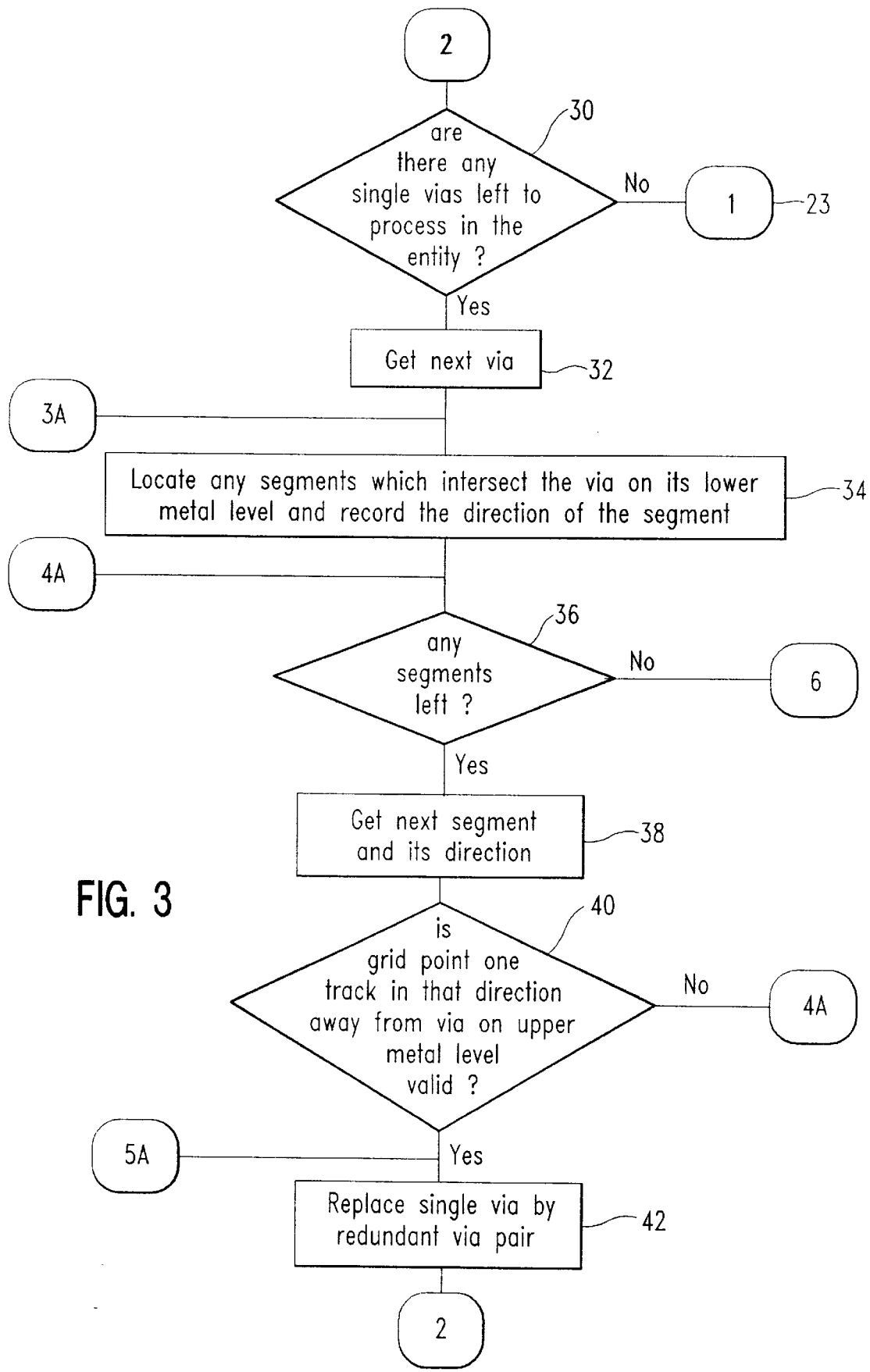
FIG. 3 is a block diagram of the Lower Metal Segment Intersection operation of this invention.

Referring to FIG. 3, the tool begins the process of inserting redundant via pairs, first focusing on metal segments that intersect single vias. One favors inserting redundant via pairs in these segments since it minimizes the additional critical metal added. To do this the tool first checks at decision step 30 to see if there are single vias left to be processed. If there are none it, loops back (through 1) to decision step 24 to see if there are any entities remaining unexamined. The tool then gets the next via (32) and proceeds to examine its lower metal layer for intersecting line segments at step 34, recording the direction of each segment detected.

At steps 36, 38, and 40 the tool is determining whether it can place redundant via pairs on any of the detected segment directions. Decision step 36 determines whether there are any detected segments left unexamined for possible redundant pair placement. If there are no detected segments or no segments left to examine for possible via placement the tool proceeds to the next major operation Upper Metal Segment Intersection (through 6). If there are potential directions that remain unexamined the tool at 38 gets the next segment and its direction. At decision step 40 the tool attempts to place redundant vias in a direction of detected metal segments. The test is a simple question:

Is the grid point one track away from the via on the upper metal level valid?

If it is valid at step 42, you replace the single via by a redundant via pair and proceed to examine the next single via (through 2). If you fail to place a pair you loop back to step 36 through 4A. Note that this embodiment selects the first direction that meets the rule. This is best for reducing processing time. A designer could establish other parameter such that it would examine all directions and if more than one was selected favor one over the other. For example, factoring in the environment, one direction may be better for maximizing the number of redundant pairs produced.

Figure 4A:
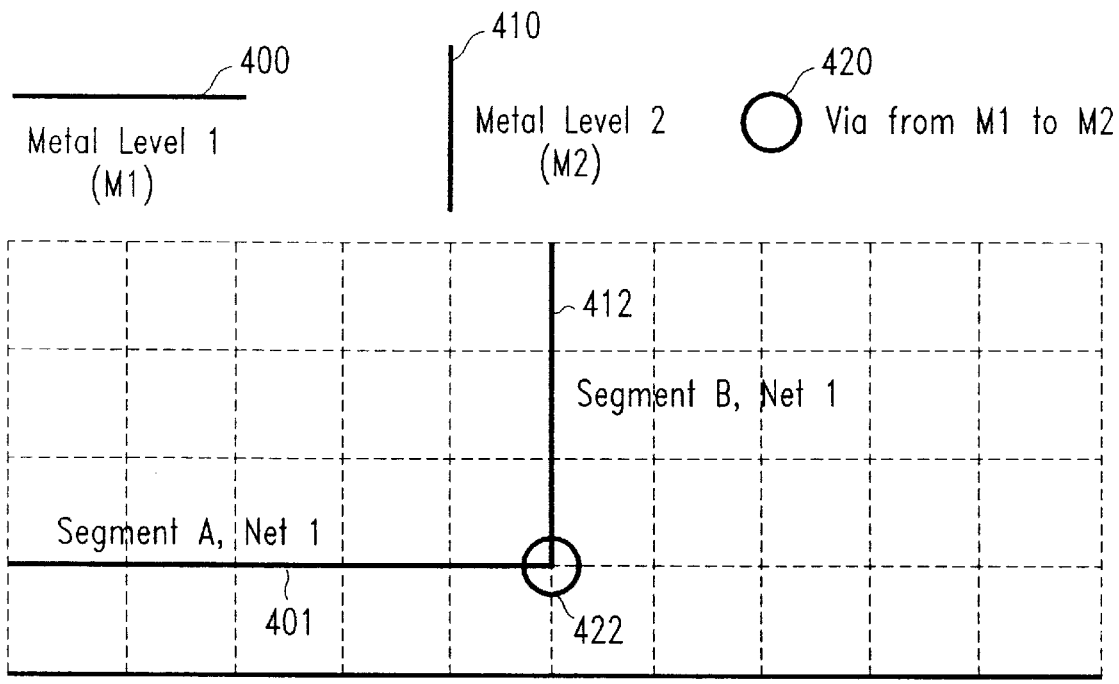
FIGS. 4A and 4B illustrate an example of the insertion of a redundant via pair on a lower metal segment.
Figure 4B:
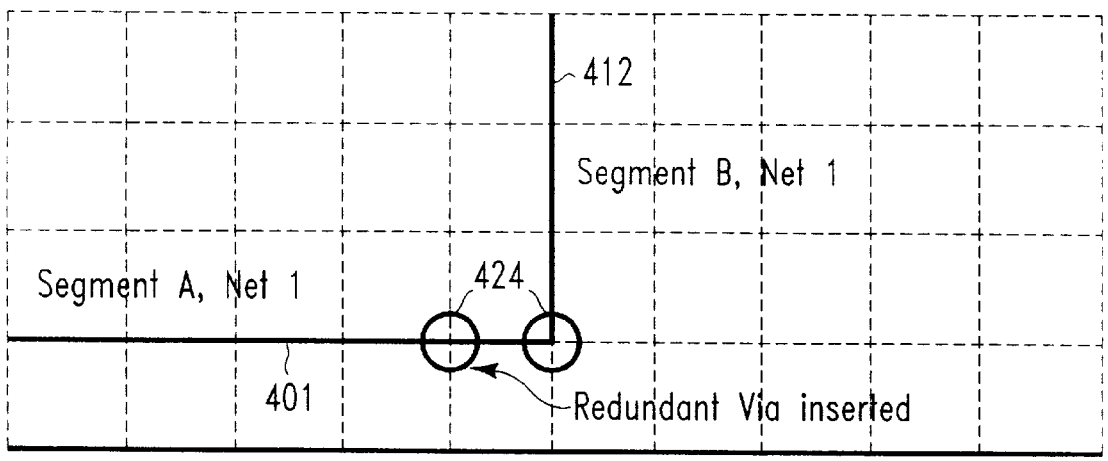

FIG. 4A illustrates a single via (422) which connects to levels of metal, M1 (401) running west to east, and M2 (412) running north to south. The tool first looks for wire segments on level M1 and locates Segment A, Net 1 (401) going west. It then examines level M2 one track west of the single via, and determines whether that grid point on level M2 is valid. Under some design rules that grid point would need to be free. However, where design rules allow, it could also be valid if it contains a metal segment or the same net. Since it is free in this case, redundant via pair 424 in FIG. 4B is inserted into the design. In the design it retains its original designation as a single via, but now also includes the identifier "W" to indicate that a redundant via pair was formed with the insertion of a single via west of the original single via.

Figure 5:
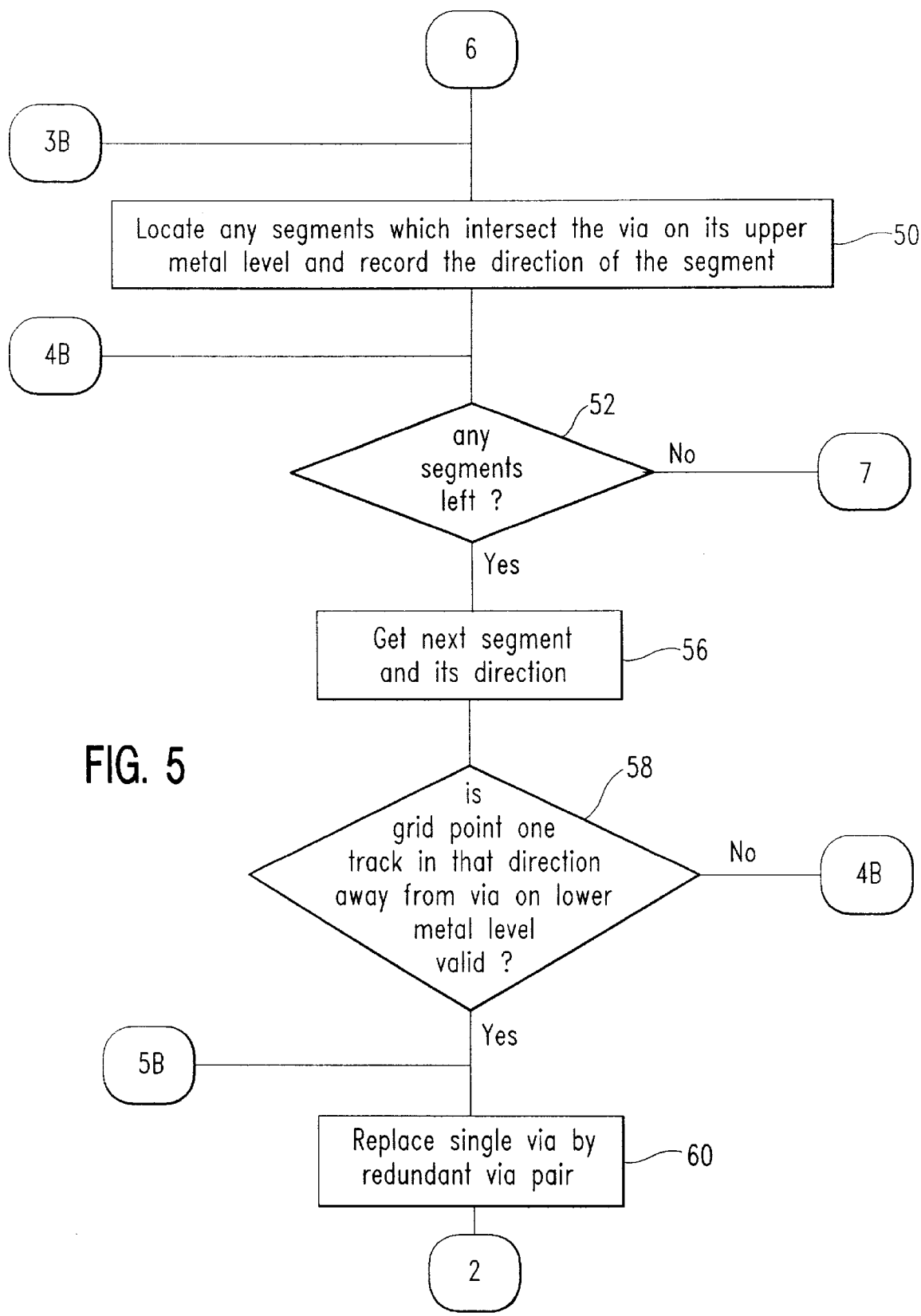
FIG. 5 is a block diagram of the Upper Metal Segment Intersection operation of this invention.

If the tool was unable to place a redundant via pair on a lower metal segment, it moves to the next operation which is the Upper Metal Segment Intersection examination illustrated in FIG. 5. Note that examining the lower first then the upper is not mandatory. One could reverse the direction of examination or as stated previously, prioritize the order in which single vias are examined. What is important is that in an effort to minimize critical metal and maximize redundant via pairs both metal layers adjacent to each single via are examined.

The Upper Metal Segment Intersection operation is very similar to the previous examination of the lower metal layer. The tool first locates the intersecting segments (50). Then at decision step 52 determines whether there are any segments to examine (or if any are left unexamined). If there are none it branches to the next operation (through 7), Remaining Non-Examined Directions. If there are intersecting segments in the upper level, it gets the next segment and its direction (56) and then applies the same rule as the Lower Metal Segment Operation, except instead of looking at the upper metal, it examines the lower metal level. If the test fails it branches back to decision step 52. If the grid point is available a redundant via pair replaces the single via (60) and the tool branches through 2 to the determine whether there are remaining single vias unexamined.

Figure 6A:
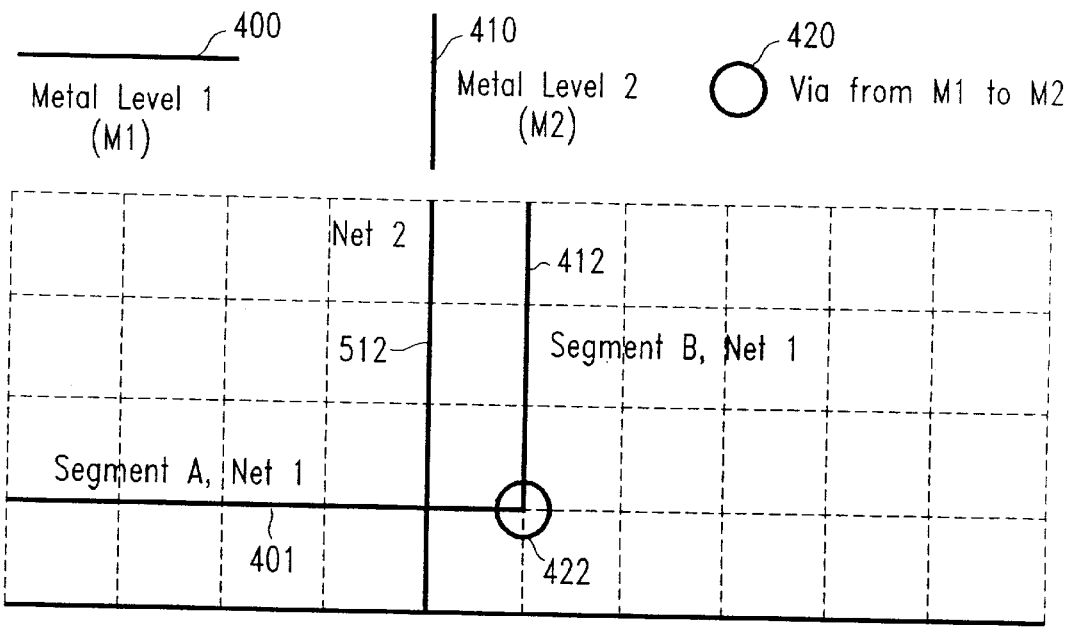
FIGS. 6A and 6B illustrate an example of the insertion of a redundant via pair under an upper metal segment.
Figure 6B:
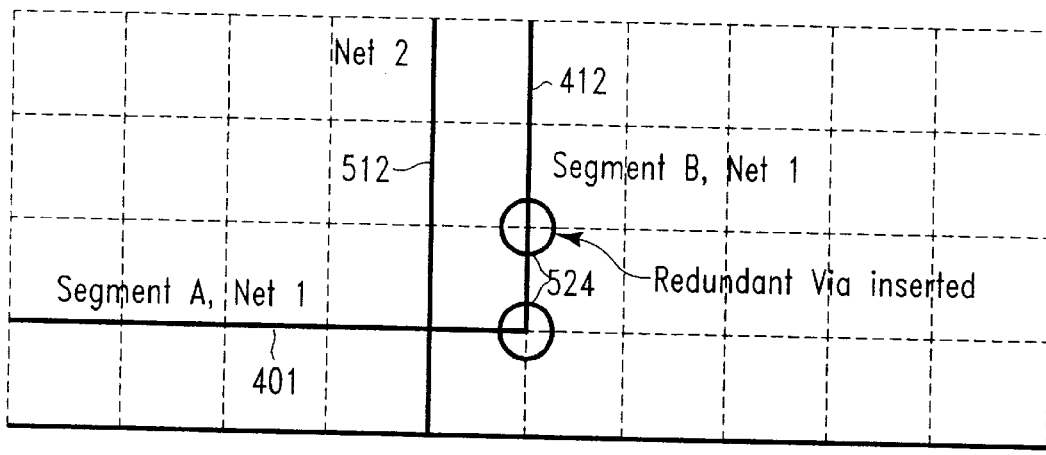

FIGS. 6A and 6B illustrate how this operation is applied to a single via. FIG. 6A is the same as FIG. 4A except now there is another net 512 running north to south. So when the tool attempts to place a redundant via on line 401 one grid point from single via 422 during lower metal segment intersection examination, the test fails. This is because net 512 blocks the application of a single via at the grid point on the upper metal level. Because there are no other segments available on the lower level, the tool tries to locate segments on the upper level. There is a Segment B, Net 1 on metal level 2 (412) which intersects single via 422 going north. The tool proceeds to examine whether one track north of single via 422 is valid. In this case it is and a redundant via pair 524 is inserted in the design and is denoted as single via north.

If the tool has not inserted a redundant via during the Lower or Upper Metal Segment Intersection operations it then performs the third primary operation, Remaining Non-Examined Directions, illustrated in the flow chart of FIG. 7. First, the tool locates any directions not yet examined in either the lower and upper level searches (60). If there are no directions unexamined, a redundant via cannot be inserted and the tool at decision step 62 branches back to decision step 30 (through 2) to see if there are any single vias left unexamined. If there are directions left unexamined, it gets the next direction for examination (64) and at 66 applies the following test:

Are grid points in this direction one track away from the single via on both the upper and lower metal levels valid?

If the answer is no, it branches back to decision point 62 (through 8) to see if there are any directions left for examination. If the answer is yes, the single via is replaced by a redundant via pair (68). After that the tool steps to decision step 30 (through 2) to see if there are any other single vias left for examination.

Figure 8A:
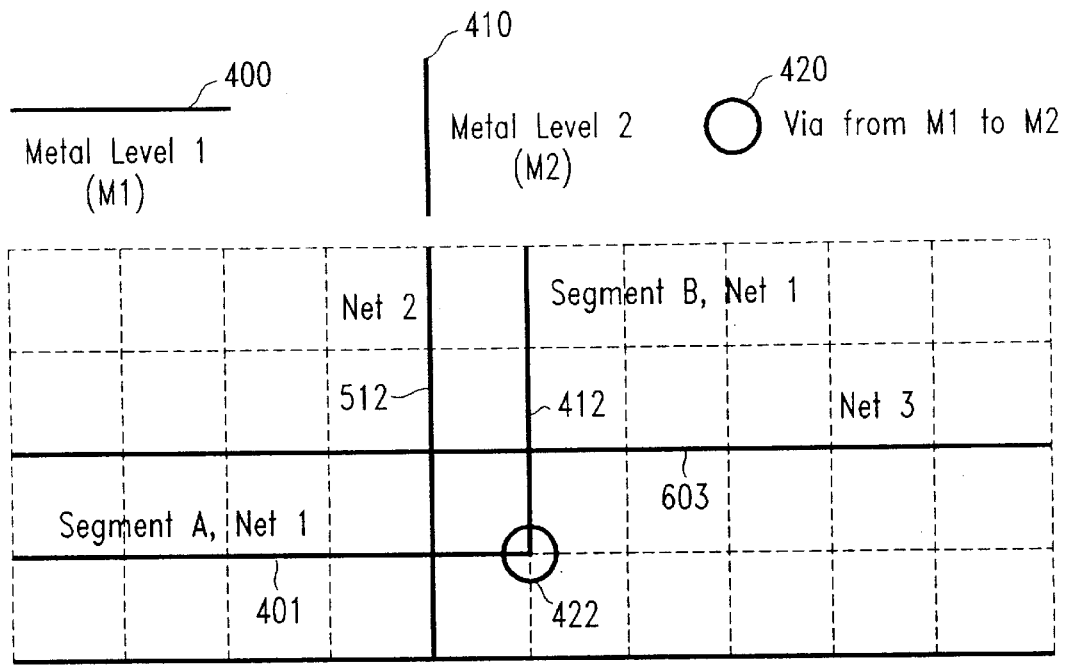
FIGS. 8A and 8B illustrate an example of the insertion of a redundant via pair in the case where there is no metal segment intersection.
Figure 8B:
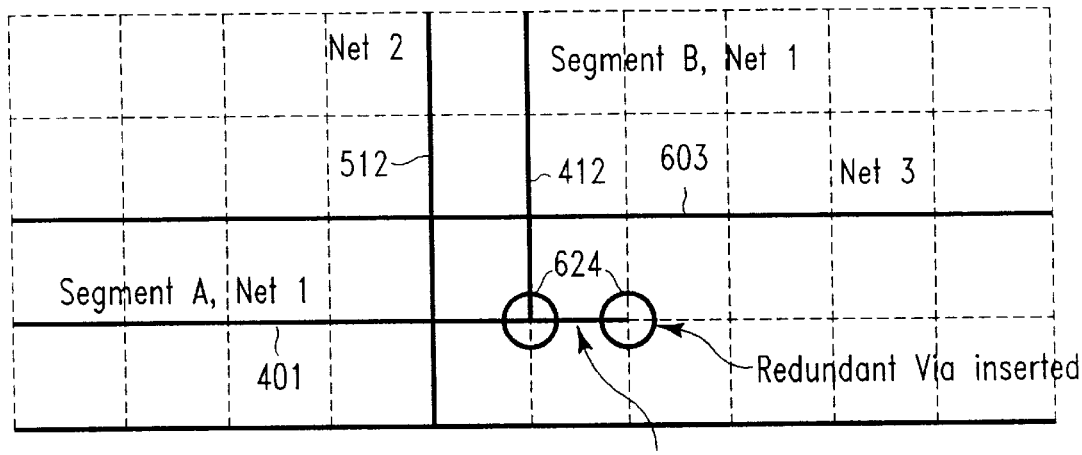

FIGS. 8A and 8B illustrate how this operation works in examining a single via. FIG. 8A illustrates the same portion of a design as FIG. 6A, except there is a third net added to the design 603. 603 blocks the placement of a redundant via at a grid point North of single via 422 and since all the segments intersecting at single via 422 are blocked from inserting a via, the tool now searches for any remaining directions (East and South) around the single via 422 for placement. After testing the eastern direction, the tool inserts a redundant via pair 624 one track east as shown on FIG. 8B and metal is added both M1 and M2 in order to establish the connection. The via is denoted single via east.

Figure 9:
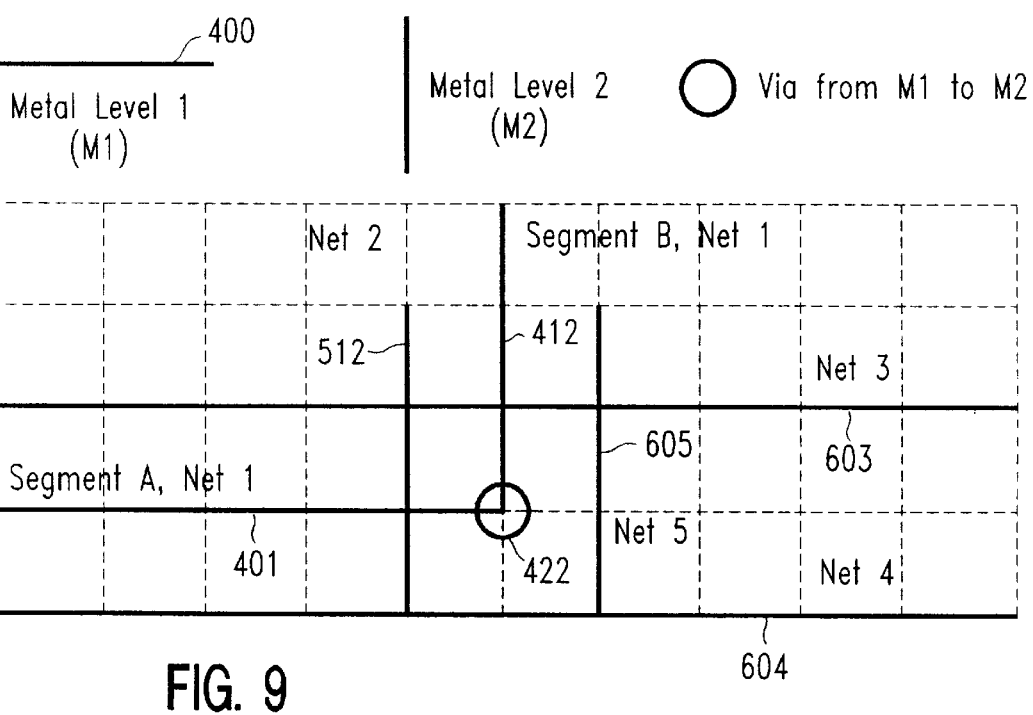
FIG. 9 illustrates a metal interconnect wiring design where a single via cannot be replaced by a redundant via pair.

FIG. 9 illustrates an example of a design where the tool is unable to insert a redundant via. This design is the same as FIG. 8A except a fourth net 604 running west to east on M1 is in the design and a fifth net (605) on M2 running north to south. Now, in addition to the tracks being blocked to the north and west of single via 422 by Net 3 (603) and Net 2 (512), we find that Net 5 605 and Net 4 604 block attempted placements in the east and south directions respectively.

In summary, the operational flow for the tool is as follows:
1. For hierarchical designs, repeat steps 2–9 for every entity. (1 in FIG. 2)
2. Examine every global single via in the design. (2 in FIG. 3)
3. Locate any segments which intersect the via on its lower metal layer. Determine the directions of these segments. (3A in FIG. 3 and 3B in FIG. 5)
4. For each direction determined in step 3, examine the grid point one track in that direction away from the via on the upper metal level. (4A in FIG. 3)
5. If the grid point is available, replace the single via with a redundant via pair at this location. Return to step 2 to process the remaining vias. (5A in FIG. 3 and 5B in FIG. 5)
6. Once all directions in step 3 have been exhausted, repeat steps 3–5 examining the upper metal level of the via in the same manner looking to the lower level to see if the grid one track below is valid. (4B in FIG. 5)
7. If any directions (east, west, north or south) remain which have not yet been examined, continue to step 8. Otherwise, this via cannot be replaced by a redundant via pair; return to step 2 to process the remaining vias. (7 in FIG. 7)
8. For each remaining direction, examine the grid points one track away from the via on the lower metal level and one track away from the via on the upper metal level, as was done in step 5. If the grid points are both available, replace the single via with a redundant via pair at this location and return to step 2 to process the next via. (8 in FIG. 8)

9. Once all of the directions in step 8 have been exhausted, this via cannot be replaced by a redundant via pair. Return to step 2 to process any remaining vias.

The software program tool which removes redundant via pairs simply locates every redundant via pair created by the insertion algorithm and replaces the via with a single via, preserving any redundant via pairs which were inserted by another method.

The following table shows the percentage of vias for which redundant via pairs were inserted for each metal level in four ASIC designs. Of note, the third design was difficult to wire, yet the invention was able to insert redundant via pairs for 73% of the design's vias. The runtimes given are elapsed wall clock run times for the insertion algorithm only. They do not include tool loadtime or tool save time. With the exception of the fourth design which was run on an IBM RISC 6000 Model 560 hardware environment all designs were run on an IBM RISC 6000 Model 59H Hardware environment.

TABLE 1

Redundant Via Results

| Design Size | Total Vias | PC-M1 % | M1-M2 % | M2-M3 % | M3-M4 % | Total % | Elapsed Insertion Time |
| --- | --- | --- | --- | --- | --- | --- | --- |
| 5 mm | 143,929 | N/A | 73% | 89% | 94% | 83% | 10 minutes |
| 8 mm | 184,948 | N/A | 78% | 93% | 92% | 86% | 8 minutes |
| 8 mm | 868,900 | N/A | 68% | 84% | 82% | 73% | 1 hour, 25 minutes |
| 12 mm | 1,589,087 | 33% | 80% | 87% | 94% | 78% | 3 hours, 16 minutes (560) |

This approach reduced processing time by as much as ten times over the shapes-based approach mentioned previously.

Runtimes for the removal algorithm are trivial in comparison. In the smaller test cases, removal took less than a minute. For the largest design (the fourth test case), the elapsed wall clock time for redundant via pair removal on a RISC 6000 Model 560 was 17 minutes.

In actual production, a redundant via pair is actually a single via with an additional single via replicated in the direction proscribed this invention. Primarily, this is due to reasons of the particular process in use, in this case International Business Machine Corporation's CMOS 5X semiconductor process. However, this is not required and the metal area of the single via can be enlarged in the direction of the redundant via by other means.

Although the present invention and its advantages have been described in detail, it should be understood that various changes, substitutions and alterations can be made herein without departing from the spirit or scope of the invention as defined in the appended claims.

What is claimed is:

1. An automated method for inserting redundant via pairs in an integrated circuit design comprising the steps of:
   determining single vias in the wiring design;
   examining directions in an area in a first level around each single via for wire segments;
   for each direction for which a wire segment is detected, testing to see if the area in an adjacent level is valid;
   creating a redundant via pair in the area of the adjacent level the test shows as valid;
   if no redundant via is created, examining directions in an area in the adjacent level around each single via for wire segments;
   for each direction for which a wire segment is detected, testing to see if the area in the first level is valid;
   creating a redundant via pair in the area of the first level the test shows as valid;
   if no redundant via pair is created and there are directions around each single via remaining unexamined, testing an area around the unexamined directions on both levels adjacent the single via to see if they are valid; and
   creating a redundant via pair in the area around the unexamined direction the test shows as valid,
   wherein the test for inserting redundant via pairs on detected wire segments in the first level is whether a grid point one track in the same direction away from the single via in the adjacent level is valid and the test for inserting the redundant via pair on detected wire segments in the adjacent level is whether a grid point one track in the same direction away from the single via in the first level is valid.

2. The invention of claim 1 where the test for unexamined directions after no wire segments are detected is whether a grid point in an unexamined direction one track away from the single via in both first and adjacent levels is valid.

3. The invention of claim 1 where the first level is a lower level and is tested first.

4. The invention of claim 1 in which each redundant via pair is created under a protocol that allows for their removal.

5. The invention of claim 4 where the redundant via pairs protocol established is symbolized as a single via with a direction.

6. The invention of claim 1 where the integrated circuit is an ASIC.

7. The invention of claim 1 where the circuit design is a portion of an integrated circuit.

8. An integrated circuit containing redundant via pairs created according to process comprising the steps of:
   determining single vias in the wiring design;
   examining directions in an area in a first level around each single via for wire segments;
   for each direction for which a wire segment is detected, testing to see if the area in an adjacent level is valid;
   creating a redundant via pair in the area of the adjacent level the test shows as valid;
   if no redundant via is created, examining directions in an area in the adjacent level around each single via for wire segments;
   for each direction for which a wire segment is detected, testing to see if the area in the first level is valid;
   creating a redundant via pair in the area of the first level the test shows as valid;

if no redundant via pair is created and there are directions around each single via remaining unexamined, testing an area around the unexamined directions on both levels adjacent the single via to see if they are valid; and creating a redundant via pair in the area around the unexamined direction the test shows as valid, wherein the test for inserting redundant via pairs on detected wire segments in the first level is whether a grid point one track in the same direction away from the single via in the adjacent level is valid and the test for inserting the redundant via pair on detected wire segments in the adjacent level is whether a grid point one track in the same direction away from the single via in the first level is valid.

9. The invention of claim 8 where the first level is a lower level and is tested first.

10. The invention of claim 9 where the integrated circuit is an ASIC.

11. The invention of claim 8 where the redundant vias pair is manufactured by enlarging the single via in the direction the redundant via pair is placed.

12. The invention of claim 8 where the adjacent level is an upper level is tested first.

13. A program storage device readable by machine, tangibly embodying a program of instructions executable by the machine to perform method steps for inserting redundant via pairs in an integrated circuit design comprising the steps of:

determining single vias in the wiring design;

examining directions in an area in a first level around each single via for wire segments;

for each direction for which a wire segment is detected, testing to see if the area in an adjacent level is valid;

creating a redundant via pair in the area of the adjacent level the test shows as valid;

if no redundant via is created, examining directions in an area in the adjacent level around each single via for wire segments;

for each direction for which a wire segment is detected, testing to see if the area in the first level is valid;

creating a redundant via pair in the area of the first level the test shows as valid;

if no redundant via pair is created and there are directions around each single via remaining unexamined, testing an area around the unexamined directions on both levels adjacent the single via to see if they are valid; and creating a redundant via pair in the area around the unexamined direction the test shows as valid, wherein the test for inserting redundant via pairs on detected wire segments in the first level is whether a grid point one track in the same direction away from the single via in the adjacent level is valid and the test for inserting the redundant via pair on detected wire segments in the adjacent level is whether a grid point one track in the same direction away from the single via in the first level is valid.

14. The invention of claim 13 where the first level is a lower level and is tested first.

15. A computerized design system which inserts redundant via pairs in an integrated circuit design which comprises:

means for accessing all single vias in the wiring design;
means for examining directions an area in a first level around each single via for wire segments;

means for testing each direction for which a wire segment is detected to see if the area in a second level is valid;

means for creating a redundant via pair in the area in the second level the test shows as valid;

if no redundant via pair is created, examining directions in an area in the adjacent level around each single via for wire segments;

means for testing each direction for which a wire segment is detected to see if the area in the first level is valid;

means for creating the redundant via pair in the area in the first level the test shows as valid;

means for testing an area around the unexamined directions on both the first and adjacent levels to see if no redundant via pair has been created on a wire segment;

means for creating the redundant via pair in the area around the unexamined direction the test shows as valid, wherein the test for inserting redundant via pairs on detected wire segments in the first level is whether a grid point one track in the same direction away from the single via in the adjacent level is valid and the test for inserting the redundant via pair on detected wire segments in the adjacent level is whether a grid point one track in the same direction away from the single via in the first level is valid.

16. A computerized grid-based design system which inserts redundant via pairs in an intergrated circuit design which comprises:

A computerized design system which inserts redundant via pairs in an intergrated circuit design which comprises:

means for accessing all single vias in the wiring design;
means for examining directions an area in a first level around each single via for wire segments;

means for testing each direction for which a wire segment is detected to see if the area in a second level is valid;

means for creating a redundant via pair in the area in the second level the test shows as valid;

if no redundant via pair is created, examining directions in an area in the adjacent level around each single via for wire segments;

means for testing each direction for which a wire segment is detected to see if the area in the first level is valid;

means for creating a redundant via pair in the area in the first level the test shows as valid;

means for testing an area around the unexamined directions on both the first and adjacent levels to see if no redundant via pair has been created on a wire segment;

means for creating the redundant via pair in the area around the unexamined direction the test shows as valid, wherein the test for inserting redundant via pairs on detected wire segments in the first level is whether a grid point one track in the same direction away from the single via in the adjacent level is valid and the test for inserting the redundant via pair on detected wire segments in the adjacent level is whether a grip point one track in the same direction away from the single via in the first level is valid.

* * * * *